(12) United States Patent
Bar-Mashiah et al.

(10) Patent No.: US 10,972,519 B2
(45) Date of Patent: Apr. 6, 2021

(54) REAL-TIME VIDEO STREAMING TO CLIENT VIDEO ELEMENT

(71) Applicant: FLIR Commercial Systems, Inc., Wilsonville, OR (US)

(72) Inventors: Gal Bar-Mashiah, Tel Aviv (IL); Lior Ghana, Netanya (IL); Daniel Ben-Hoda, Tel Aviv (IL)

(73) Assignee: FLIR Commercial Systems, Inc., Wilsonville, OR (US)

( * ) Notice: Subject to any disclaimer, the term of this patent is extended or adjusted under 35 U.S.C. 154(b) by 373 days.

(21) Appl. No.: 15/275,282

(22) Filed: Sep. 23, 2016

(65) Prior Publication Data

US 2017/0093939 A1     Mar. 30, 2017

Related U.S. Application Data

(60) Provisional application No. 62/222,780, filed on Sep. 24, 2015.

(51) Int. Cl.
*H04L 29/06*     (2006.01)
*H04L 29/08*     (2006.01)

(52) U.S. Cl.
CPC ........ *H04L 65/4069* (2013.01); *H04L 65/608* (2013.01); *H04L 67/02* (2013.01)

(58) Field of Classification Search
CPC ....... H04L 65/60; H04L 65/80; H04L 65/605; H04L 65/608; H04L 65/4069; H04L 65/4084; H04L 67/02; H04L 67/10; H04L 67/2842; H04L 67/2852; H04L 65/602; H04N 21/234; H04N 21/236; H04N 21/251; H04N 21/2187; H04N 21/2343; H04N 21/23106; H04N 21/23412; H04N 21/234309; H04N 21/4331; H04N 21/6543; H04N 21/643; H04N 21/8456; H04N 21/8547

See application file for complete search history.

(56) References Cited

U.S. PATENT DOCUMENTS

2011/0246659 A1\* 10/2011 Bouazizi ............ H04N 21/2343
                                                            709/231
2013/0067108 A1\* 3/2013 Nooney .............. H04L 65/4084
                                                            709/231

(Continued)

*Primary Examiner* — Nicholas R Taylor
*Assistant Examiner* — Michael Li
(74) *Attorney, Agent, or Firm* — Haynes and Boone, LLP (57) ABSTRACT

Real-time video streaming is essential in many types of systems. A system for streaming real-time video provides a low-latency solution allows systems and humans to respond to real-time events as they occur. Client application platforms, such as HTML5, may be used for web development; however, support for real-time video is very limited. The system provides the ability to stream real-time video from an originating video source to an HTML5 web application with low latency. A real-time video server includes a relay service configured to receive a video stream from a video source, a fragmented video generator configured to convert the video stream into a file-based video compression format including a plurality of video fragments, and a streaming service configured to transmit the fragmented video file to a video client for real-time playback.

20 Claims, 6 Drawing Sheets

(56) References Cited

U.S. PATENT DOCUMENTS

| | | | |
|---|---|---|---|
| 2014/0006478 A1* | 1/2014 | Eguchi | H04L 65/105 709/203 |
| 2014/0270680 A1* | 9/2014 | Bloch | H04N 21/8547 386/201 |
| 2014/0289627 A1* | 9/2014 | Brockmann | H04N 21/23412 715/719 |
| 2015/0215359 A1* | 7/2015 | Bao | H04L 65/605 709/219 |

* cited by examiner

REAL-TIME VIDEO STREAMING TO CLIENT VIDEO ELEMENT

CROSS-REFERENCE TO RELATED APPLICATIONS

This application claims priority to U.S. patent application Ser. No. 62/222,780, filed Sep. 24, 2015, the contents of which are hereby incorporated by reference in their entirety.

TECHNICAL FIELD

The present application relates generally to streaming encoded video to a client device. More specifically, the present invention relates to streaming real-time encoded video, such as H.264, to a client device that supports playback of a video file, such as web browser through an HTML5 video element.

BACKGROUND

Playing a video stream across a network poses many challenges for real-time streaming applications. In one approach, a video is compressed using a video compression format (e.g., H.264, VP8), assembled into a bitstream (e.g., MP4, WebM), and delivered from a streaming server to a compatible client device using a real-time live video protocol such as the Real-Time Messaging Protocol (RTMP) or Real-Time Transport Protocol (RTSP).

Some client devices and client software applications support video playback from files, and do not support real-time live video protocol. For example, the video element of the HTML5 specification supports video playback of compressed video files and does not support real-time live video protocols such as RTMP or RTSP. Certain adaptive streaming protocols (such as HLS & MPEG-DASH) have been developed to support live streaming into an HTML5 video element. However, these protocols do not maintain real-time video deliverance and typically introduce unwanted latencies.

There is therefore a need for improved systems and methods for video streaming to a client device that supports playback of a video file.

SUMMARY

Systems and methods are disclosed for processing and delivering a real-time video stream. In various embodiments, methods for streaming encoded video comprise receiving a video stream, converting the video stream to a file-based video compression format including a plurality of video fragments, generating a fragmented video stream using the file-based video compression format, and transmitting the fragmented video stream to a client device for real-time playback.

In one embodiment, the video stream is encoded using H.264 video compression and converted to a fragmented MP4 video stream, packaged in a fragmented MP4 container, for playback through an HTML5 video element on the client device. The client device initially buffers the received video fragments and then begins playback of the received video fragments as a video stream at a maximum available speed without displaying the video to the user. After the initial buffering is played through, the video is displayed for the user substantially in real-time. In an alternative embodiment, if a client device requires each MP4 fragment to start with an intra-coded frame, the video server may instruct the video source to compress the video stream with intra-coded frames at locations corresponding to the start of each MP4 fragment.

Each video fragment includes a timestamp identifying its placement within the video stream. The timestamp may be different for each client, depending on when the client joined the real-time video stream. The video server may also be configured to drop one or more video fragments to reduce bandwidth and processing requirements, and update the client timestamp to account for the dropped video fragment.

In another embodiment, a system for processing a real-time video stream includes a video server comprising a relay service configured to receive a video stream from a video source, a fragmented video generator configured to convert the video stream into a file-based video compression format including a plurality of video fragments, and a streaming service configured to transmit the fragmented video file to a video client for real-time playback.

In one embodiment, the video stream is encoded using H.264 video compression and the file-based video compression format is MP4 compression. The fragmented video generator may be configured to package the streamed video in a fragmented MP4 container for playback through a HTML5 video element on the client device.

In one embodiment, a video client is configured to initially buffer the received video fragments and start playing the buffered video fragments as a video stream at a maximum available speed as a video stream without displaying the video to the user. After the initial buffering is played through, the video is displayed for the user in real-time. In an alternative embodiment, if a client device requires each MP4 fragment to start with an intra-coded frame, the video server may be configured to instruct the video source to compress the video stream with intra-coded frames at locations corresponding to the start of each MP4 fragment.

The video server is further configured to assign a timestamp for each video fragment. The video fragment timestamp may be different for each client receiving the video stream, depending on when the client joined the real-time video stream. The video server may also be configured to drop at least one video fragment to reduce bandwidth and processing requirements, and update the client timestamp to account for the dropped video fragment.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, wherein showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

In accordance with various embodiments of the present disclosure, systems and methods for processing and streaming real-time video are provided.

Figure 1:
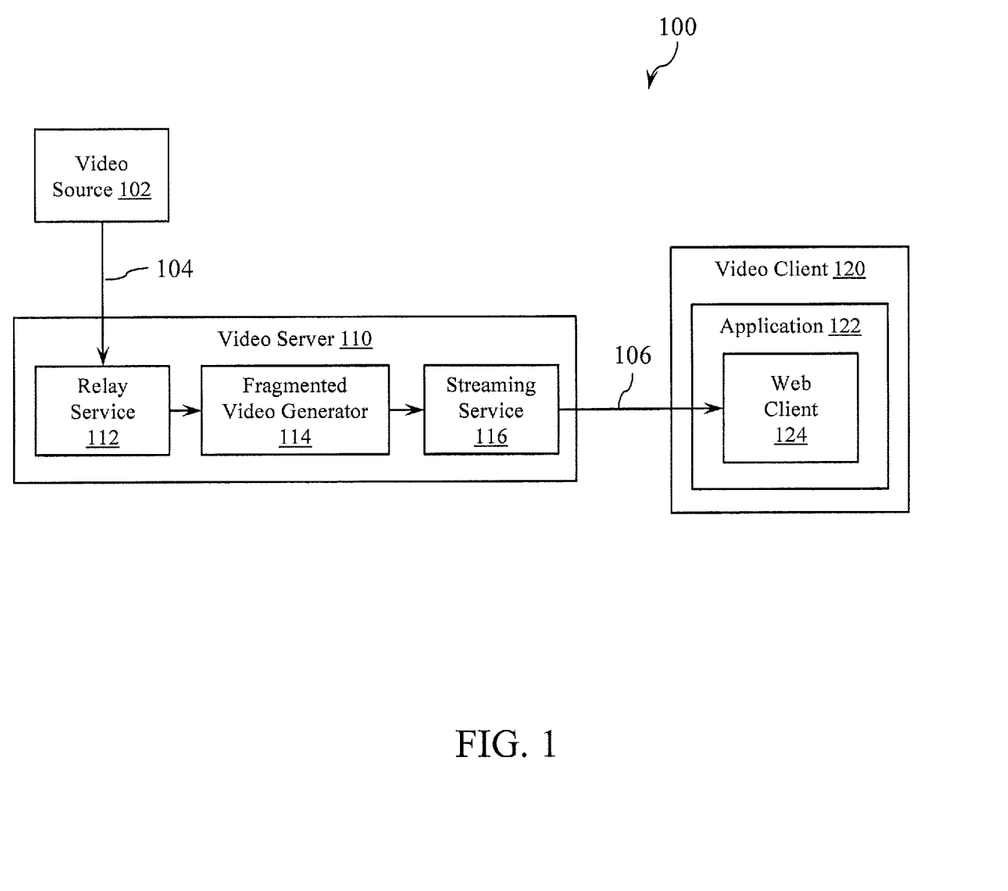
FIG. 1 is a high level block diagram illustrating an exemplary embodiment of a real-time video streaming system.

FIG. 1 illustrates a real-time video streaming system 100 in accordance with an exemplary embodiment. The system 100 includes a video source 102, a video server 110 and a video client 120. The video source 102 is a device adapted to generate a video stream. In various embodiments, the video source 102 may include specialized hardware such as an Internet Protocol (IP) camera or digital signal processor, or a software component running on a general purpose processor. In various applications, the video source 102 may include a video surveillance camera, a traffic control camera, a video playback service, or other application configured to provide a video stream 104 to the video server 110.

The video server 110 is a network server configured to receive a video from the video source 102, process the received video into a video file format, and transmit the video file 106 to the video client 120 for real-time playback as a video stream. In the exemplary embodiment, the video server 110 includes a relay service 112, a fragmented video generator 114, and a streaming service 116.

The relay service 112 interfaces with the video source 102 to receive the video stream 104. In one embodiment, the video source 102 communicates with the relay service 112 across one or more communications networks, such as the Internet, a wireless mobile communications network or a local area network. In one embodiment, the video stream 104 is an H.264 video stream transmitted to the relay service 112 using a video streaming protocol, such as RTP over UDP or RTP over TCP, depending on the quality of the network between the video source 102 and the relay service 112. The relay service 112 communicates with the video source 102 to initiate the streaming session, receive the video stream 104 and then pass the received video stream through a bit stream filter to convert the received video stream into a file format compatible with the video client 120. In one embodiment, the relay service receives a H.264 video stream from the video source 102 and converts the H.264 start-codes into frame length prefixes compatible with an MP4 container.

The fragmented video generator 114 receives the video stream processed by the relay service 112 and encapsulates the video stream into a fragmented media format. In the exemplary embodiment, the fragmented video generator uses FFmpeg, which is a cross-platform software solution used to record, convert and stream audio and video data. FFmpeg is used to encapsulate the modified H.264 video into fragmented MP4 video for streaming in accordance with part 12 of the MPEG-4 standard. Using FFmpeg, the modified frame of the received H.264 video stream is inserted into the current fragment of the fragmented MP4 stream. The fragmented MP4 stream has advantages over the video file-based approaches, allowing video streaming from the video source 102 to the application 122, such as a web browser, without the overhead of accessing slow hardware components such as hard drives. The use of fragmented MP4 allows the video stream to be sent continuously, reducing latency and making the bitrate more stable compared to progressive download solutions.

In the exemplary embodiment, the fragmented video generator 114 outputs a fragmented MP4 without performing video transcoding. The fragmented MP4 includes a moov atom written at the start of the file, including a description of the tracks and specifying zero duration. Each fragment contains a single encoded video frame. This enables a single encoded frame to pass through the video server 110, which in turn results in single frame latency. An mfra-atom is sent when the stream is stopped or ends. This atom provides random-access information for the purpose of saving the stream to an MP4 file on the client's side if desired, In one embodiment, the fragmented video generator 114 buffers about 1.5 seconds of video before releasing it for output to the video client 120. This is only an initial delay since after the fragmented video generator 114 releases the first chunk, it no longer caches video. When the web client 124 receives video for the first time, it buffers the initial fragments (e.g., the initial 1.5 second of video) and automatically plays the 1.5 seconds at the fastest available speed without displaying the video to the user. Thereafter, the video is displayed for the user at a normal speed. This method virtually eliminates the initial delay, allowing the video stream to be played substantially in real time.

The streaming service 116 receives the output stream of fragmented video generator 114 and serves as a proxy between the fragmented video generator 114 and the video client 120. In operation the streaming service 116 transmits the received output stream in real time to the video client 120. In one embodiment, the network protocol used for the video transmission is a TCP-based protocol, such as WebSocket, which may be selected based on reliability, low latency and small overhead of control data.

In the exemplary embodiment, the video client 120 includes an application 122 and a web client 124. The application 122 may be any software application providing an interface for displaying the streamed video, such as a web browser or video player application. The web client 124 is an application that receives the MP4 content from the streaming service 116 through the WebSocket connection 106. The MP4 content is received as chunks of byte arrays as generated by the fragmented video generator 114.

In one embodiment, the application 122 is a web browser compatible with the HTML5 hypertext markup language standard. HTML5 supports the playback of video files though an HTML5 video element, which provides a standard, plugin-free, cross-browser and cross-platform video solution. The HTML5 video element supports playback of a video file and does not directly support playback of streaming video data. In operation, the HTML5 video element expects a file identifier such as uniform resource identifier, not a stream of real time video data. In one embodiment, Media Source Extensions (MSE), a specification that allows JavaScript to send byte streams to media codecs within web browsers that support HTML5 video, is used. The web client 124 uses the MSE to feed the HTML5 video element with the byte stream it receives from the streaming service 116.

The MSE specification does not require that every fragment inside the MP4 start with an intra-coded frame. However, some browsers and other client applications may require that every fragment will start with an intra-coded frame. Since a fragment must be fully created before it can be sent, supporting such applications could add delay of at least the size of one group of pictures (GOP). To reduce this delay, the video source 102 can be configured to produce intra-coded frames at regular intervals (e.g., 1 second) to correspond to the start of each fragment.

The application 122 is configured to provide the user of the video client 120 access to the real-time video stream, allowing the user to select the video stream for real-time playback on the client device 120. In an exemplary operation, the user selects the video stream through a user interface of the video client 120 (e.g., by selecting a URL link), and the application receives and decodes video fragments and displays the received video in real-time on a display of the video client 120. The latency from the moment a frame is captured on the video source 102 until it is displayed on screen of the video client 120 includes of many components, including capturing latency, encoding latency, network latency, processing latency, decoding latency and rendering latency. The system described herein allows reducing the processing latency to the length of a single frame. For example, the stream may be received by implementing a custom I/O buffer which allows the streamed video to be kept in the data in memory, further reducing latency.

Figure 2:
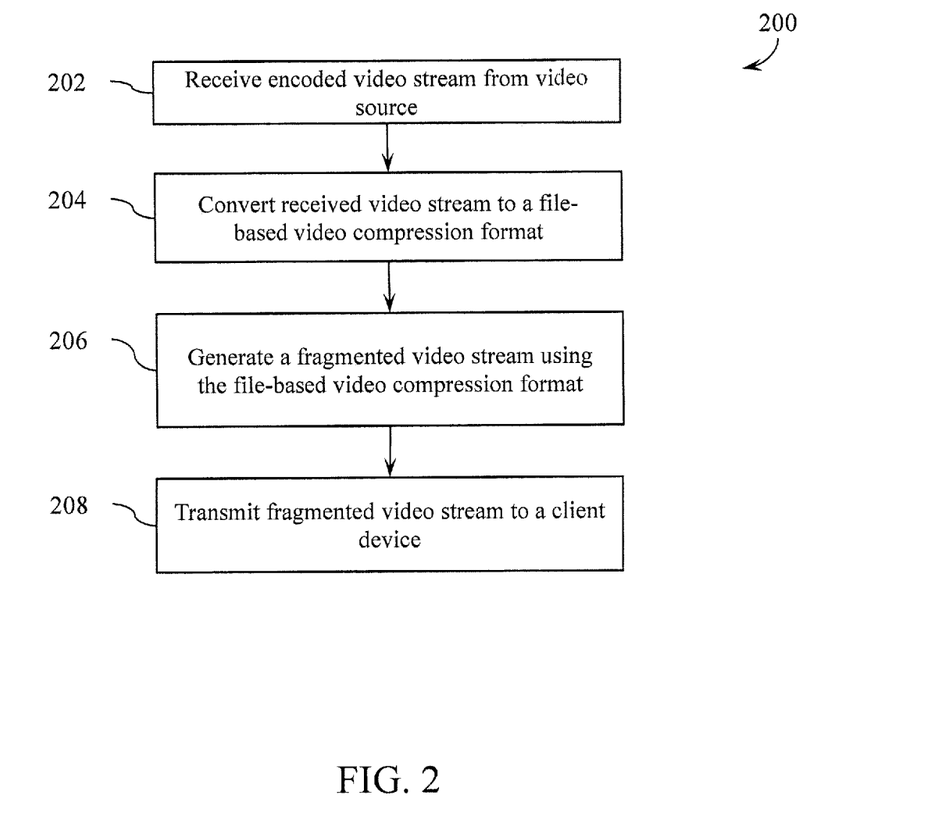
FIG. 2 is a flow diagram illustrating an exemplary operation of a video server in accordance with an embodiment.

Referring to FIG. 2, a method 200 for processing a real time video stream for real time playback on a file-based video platform is described. In step 202, a video server receives an encoded video stream from a video source. In one embodiment, the encoded stream is an H.264 video stream. In step 204, the received video stream is modified to fit a file-based video compression formation, such as MP4. In step 206, the video stream is converted into a fragmented video stream compatible with the file-based video compression format. In step 208, the fragmented video stream is transmitted to a client device for real-time playback.

Figure 3:
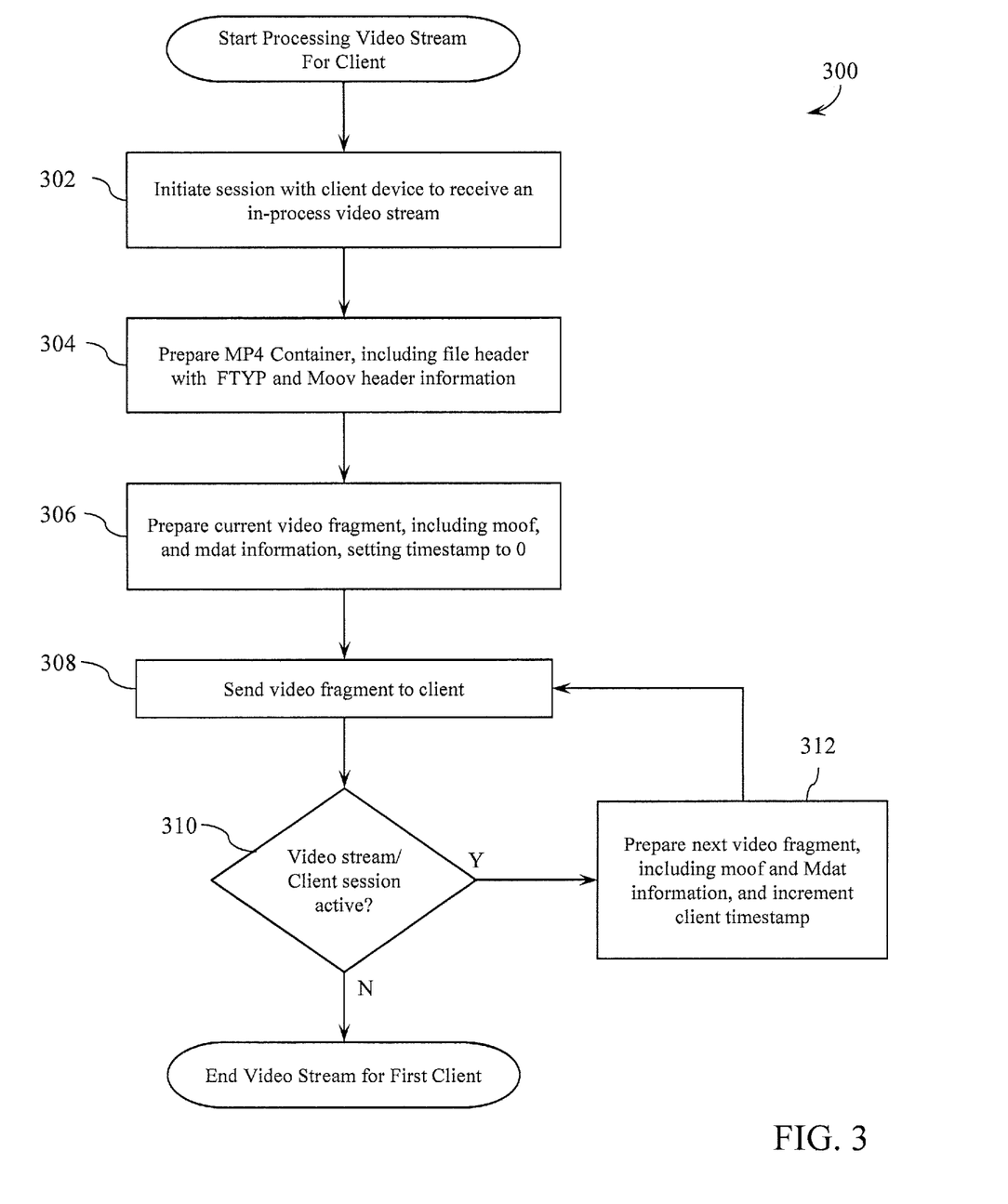
FIG. 3 is a flow diagram illustrating an exemplary operation of a video server streaming fragmented video to a plurality of client devices.

Referring to FIG. 3, a method 300 for streaming video to a plurality of clients is described. The video server is configured to prepare a video stream in accordance with the embodiments described in FIG. 1 and FIG. 2, and deliver the fragmented video stream to a plurality of clients who may join the live stream at any time. Each client device is adapted to recognize the video file format used in the fragmented video stream, such as an MP4 container in the exemplary embodiment. MP4 files start with known headers, such as with ftyp and moov headers which are followed by moof and mdat fragments at the end. In step 302, a new client joins a real-time video stream that is already in process. In step 304, the video server prepares a new MP4 container in response to the client's request, including ftyp and moov data previously used and stored for the in-process video stream. In step 306, the first video fragment is prepared for the new client from the fragmented video stream.

The modified fragments are the same as the original fragments of the video stream except that the timestamp for the new client video stream is started at zero. In one embodiment, the BaseMediaDecodeTime of the first fragment will be 0 instead of the value assigned in other client streams. The BaseMediaDecodeTime of the second fragment will be 0 plus the FrameDuration of the preceding fragment. In step 308, the video fragment is sent to the client. If the client session and video stream are still active (step 310), then the next video fragment is copied from the main video stream and modified with an incremented client timestamp in step 312. If the video stream from the video source terminates or if the client terminates the real-time streaming session, the video stream for the client will terminate.

Figure 4:
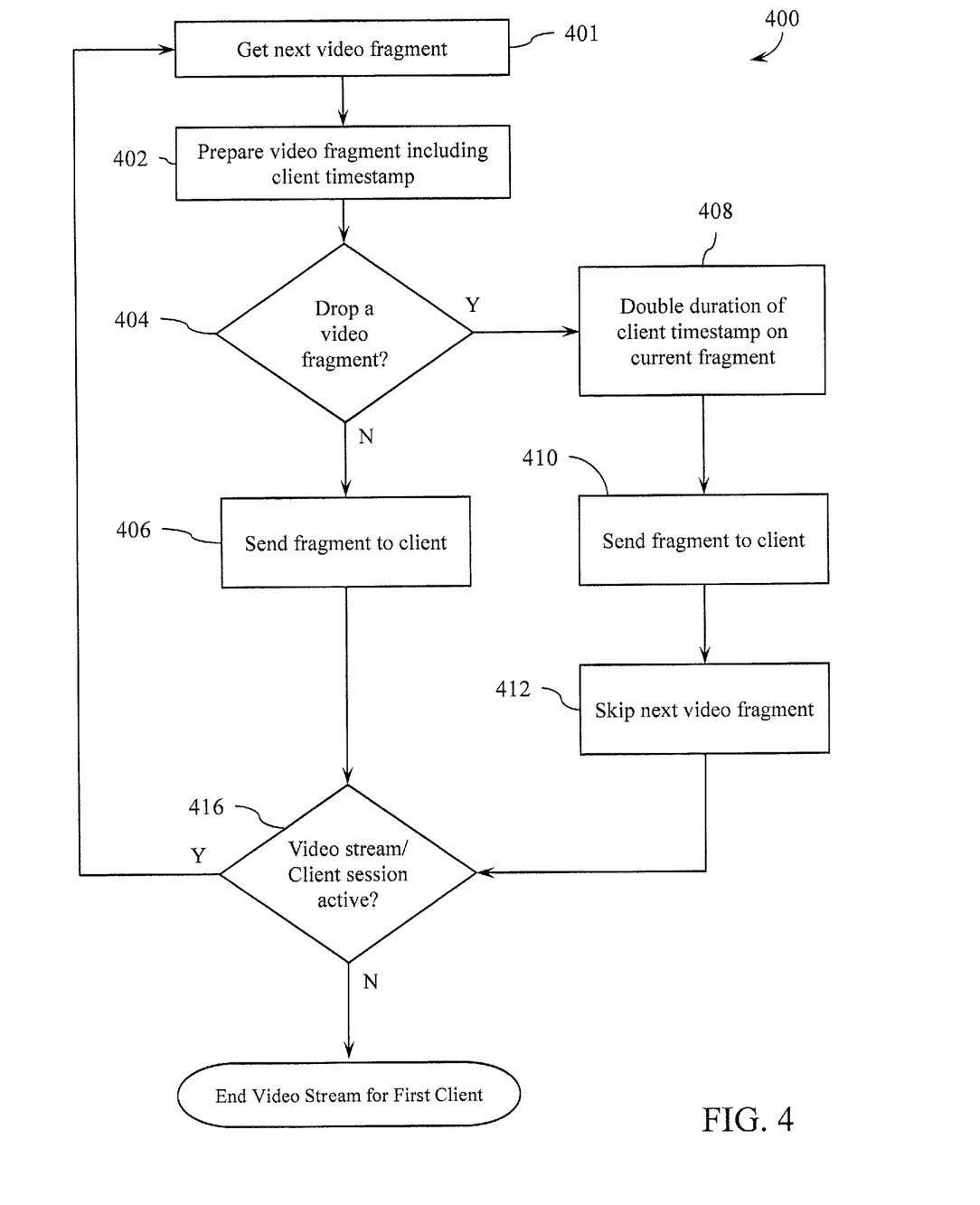
FIG. 4 is a flow diagram illustrating an exemplary operation of a video server dropping video fragments prepared for a client device.

Referring to FIG. 4, an embodiment of a method for operating a video server in low bandwidth scenarios is described. To preserve real-time playback across a slow network, on client device with limited processing capabilities, or in other low bandwidth scenarios, fragments may be intentionally dropped by the video server to reduce the size of the fragmented video stream. However, when a fragment is dropped subsequent fragments become invalid due to incorrect timestamps. In step 401, the next video fragment is received from the video stream. Next, in step 402, a video fragment is prepared for the client, including client timestamp information. If the client is receiving and processing the fragmented video stream in real-time (step 404) then the fragments are maintained and the video fragment is sent to the client in step 406. If the network connection or client device is too slow to process the fragmented video stream in real time, the video server may periodically drop a fragment to reduce the bandwidth requirements until real-time playback is achieved (step 404). In one embodiment, when dropping a fragment 'x', fragment 'x−1' is altered by doubling the frame duration of frame 'x−1' to match the BaseMediaDecodeTime of fragment 'x+1.' In step 408, the duration of the client timestamp in the current video fragment is doubled. The video fragment is sent to the client in step 410 and the next video fragment is skipped in step 412. The process continues with the next video fragment in step 401 and the updated timestamp data until the video stream or client session is no longer active (step 416). This technique maintains a full MP4 stream, while allowing the server to drop an arbitrary number of fragments midstream.

Figure 5:
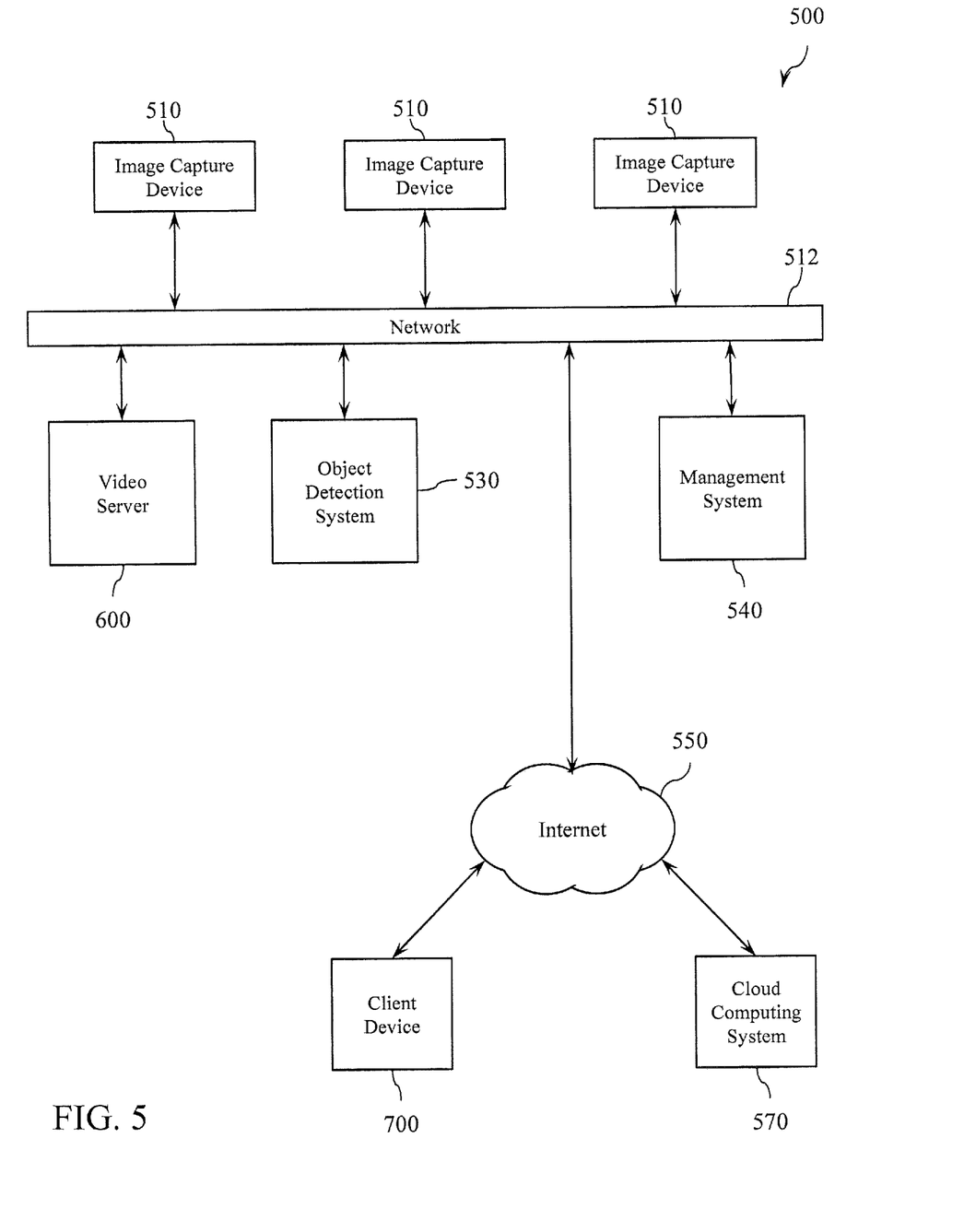
FIG. 5 is a diagram illustrating an exemplary video surveillance system in accordance with an embodiment.

FIG. 5 illustrates an exemplary video surveillance system 500 in accordance with an embodiment of the disclosure. The video surveillance system 500 includes a plurality of image capture devices 510 connected to a network 512. The network 512 may be a local network such as a wireless local area network (WLAN), a wide area network such as the internet, or other network suitable for facilitating communications between components as described herein. The image capture devices 510 may communicate with one or more other networked devices over wired and/or wireless communications paths, such as a client device 700, a video server 600, an object detection system 530, a management system 540 and/or a cloud computing system 570. As shown, the image capture devices 510 may be connected to the network 512; however, the image capture devices 510 may also, or alternatively, be connected to another device such as a video server 600, or another processing, storage and/or encoding device.

In operation, an image capture device 510 captures a series of video images of its field of view and is configured to digitize and store successive captured images as a video stream. The video stream is compressed in accordance with a video compression algorithm such as H.264, which produces a series of video frames. The captured video stream may be digitized into a series of frames in accordance with the video compression protocol that utilizes key frames (I-frames) and at least one type of intermediary frame, such as predictive pictures (P-frames) and bi-predictive pictures (B-frames). A key frame (I-frame) is a stand-alone picture that is compressed without reference to other frames. A predictive frame (P-frame) includes only the changes from the previous frame, and a bi-predictive frame (B-frame) is coded to include differences from the preceding and succeeding frames in the video to further reduce the frame size.

The video server 600 is configured to receive video streams from the one or more image capture devices 510. In one embodiment, the image capture devices 510 are IP-enabled devices (e.g., IP-enabled thermal imaging cameras) connected to the network 512, and the video server 600 functions as a network video server for other devices on the network 512. In an alternate embodiment, the image capture devices 510 are configured to provide a video stream and associated data to the video server 600 when an object or event is detected in the captured thermal images. The video stream may include data associated with a detected object such as a moving object that extends from the time the object is detected in the field of view of the image capture device 510 to the time the object leaves the field of view. In another embodiment, the video data may be recorded and provided to cloud computing system 570. In various configurations, video data associated with detected objects or events may be stored by any or all of image capture devices 510, video server 600, cloud computing system 570 and/or client device 700.

The video server 600 may include one or more processing, storage and/or encoding devices and components of the video surveillance system 500, and may include one or more processors and one or more memory devices (e.g., volatile and/or non-volatile memory devices such as RAM (Random Access Memory), ROM (Read-Only Memory), EEPROM (Electrically-Erasable Read-Only Memory), flash memory, a disk drive, and/or other types of memory). In various embodiments, the video server 600 may include a digital video recorder (DVR), a network video recorder (NVR), and/or a device having both DVR and NVR capabilities.

Management system 540 includes software for configuring, administering and monitoring the video surveillance system 510, and may be accessed remotely through a client device 700. Each of client device 700 and management system 540 may be implemented as a computing device such as a desktop computer or a mobile computing device such as a mobile phone, tablet, personal digital assistant (PDA), laptop computer or other computing device having communications circuitry (e.g., wireless communications circuitry or wired communications circuitry) for connecting with other devices in video surveillance system 500.

Object detection system 530 may include one or more servers such as an application server that performs image processing and/or other software execution operations for identifying objects in captured thermal images. The object detection system may include one or more processors (e.g., logic devices, microcontrollers, processors, application specific integrated circuits (ASICs), field programmable gate arrays (FPGAs) or other devices) that may be used by object detection system 530 to execute appropriate instructions, such as software instructions stored in memory of the object classification system 530. The object classification system may further include an object detection database which stores object classification criteria for use in determining whether an object is in a captured image stream and to classify such objects. In various embodiments, one or more features of the object detection system 530 may be integrated into an image capture device 510, the video processing system 600, the cloud computer system 570 or other devices connected to system 500. For example, an image capture device 510 for use in a traffic control system may include object detection processing components, allowing the image capture device 510 to detect objects such as automobiles, motorcycles, and pedestrians in real time.

Cloud computing system 570 may include one or more servers and/or one or more databases. According to various embodiments, cloud computing system 570 may include one or more processing servers such as an application server that performs data processing and/or other software execution operations for system 500 (e.g., video analytics, data compression or encoding, data encryption, synopsis video generation, and/or other applications), or may be provided with other functionality such as video storage capabilities. The cloud computer system may include one or more processors (e.g., logic devices, microcontrollers, processors, application specific integrated circuits (ASICs), field programmable gate arrays (FPGAs) or other devices) that may be used by cloud computing system 570 to execute appropriate instructions, such as software instructions stored in memory of the cloud computer system 570.

Figure 6:
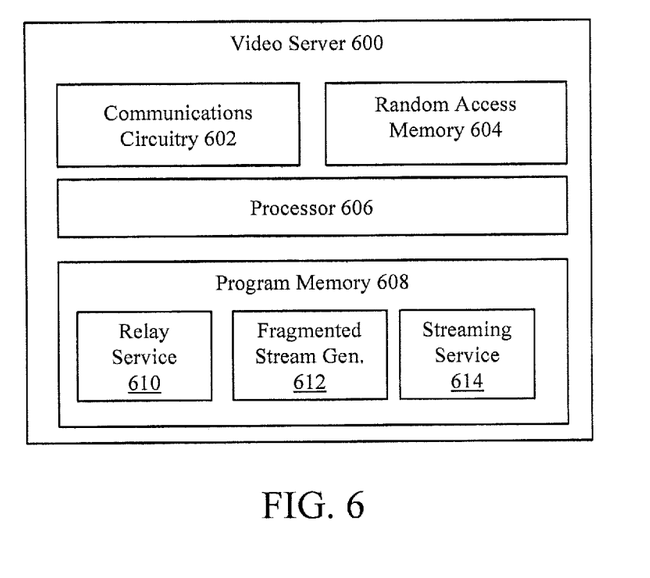
FIG. 6 is a diagram illustrating an exemplary embodiment of a video server.

As shown in FIG. 6, an embodiment of a video server 600 may include components of a network server including communications circuitry 602, a random access memory 604, a processor 606 and program memory 608. The video server 600 may represent any type network video server capable of meeting the requirements of a video server 600 as described herein and is not limited to any specific embodiment. The components illustrated in FIG. 6 may be implemented as a standalone server in one embodiment, may be distributed among a plurality of different devices, or may include additional components of the system described in FIG. 5.

Processor 606 may be implemented as any appropriate processing device (e.g., logic device, microcontroller, processor, application specific integrated circuit (ASIC), a field programmable gate array (FPGA), or other device) that may be used by video server 600 to execute appropriate instructions, such as software instructions stored in memory 608, which include a relay service module 610, a fragmented stream generation module 612 and a streaming service module 614 as described above.

Memories 604 and 608 may include one or more memory devices (e.g., memory components) that store data and information, including image data (e.g., including thermal imaging data), audio data, network information, camera information, and/or other types of sensor data, and/or other monitoring information. The memory devices may include various types of memory for information storage including volatile and non-volatile memory devices, such as RAM (Random Access Memory), ROM (Read-Only Memory), EEPROM (Electrically-Erasable Read-Only Memory), flash memory, a disk drive, and other types of memory described herein. In some embodiments, processor 606 may be configured to execute software instructions stored on memory 608 to perform various methods, processes, or operations in the manner described herein.

Communications circuitry 602 may include circuitry for communicating with other devices using various communications protocols. As examples, communications circuitry may include near field communications (NFC) circuitry (e.g., a powered or unpowered NFC integrated circuit that generates, receives, and/or processes communication signals according to radio-frequency identification (RFID) standards such as the ISO/IEC 14443, ISO/IEC 18092 or FeliCa standards), wireless network (WiFi®) circuitry, a modular cellular component that generates, receives, and/or processes communications signals over one or more cellular data networks, wireless communication components that generate, receive, and/or process communications signals based on, for example, the Bluetooth® standard, other appropriate short range wireless communication standards circuitry, a wireless broadband component (e.g., based on WiMax technologies), a wireless satellite component, or other appropriate wireless communication components.

Communications circuitry 602 may also be configured for a proprietary wireless communication protocol and interface based on radio frequency (RF), microwave frequency (MWF), infrared frequency (IRF), and/or other appropriate wireless transmission technologies. Communications circuitry 602 may include one or more antennas for wireless communication purposes. Thus, in one example, communications circuitry 602 may handle, manage, or otherwise facilitate wireless communication by establishing wireless communication links to a wireless router, hub, or other appropriate wireless devices.

Communications circuitry 602 may also be configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communications circuitry 602. Communications circuitry 602 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies.

Communications circuitry 602 may be used to receive video streams and files from image capture devices and stream video to one or more video clients. The video streams and files may be compressed before transmission, such as with industry standard video compression formats which may include MPEG-2, MPEG-4, H.263, H.264, and MJPEG standards to reduce network bandwidth and image processing constraints and storage capacity requirements.

Figure 7:
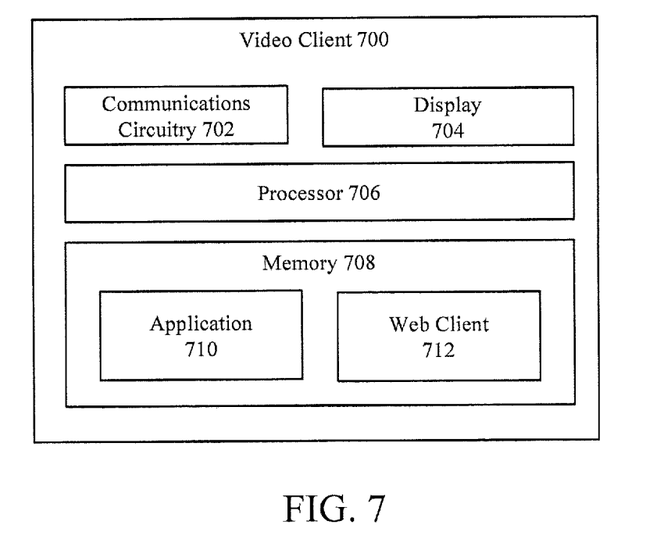
FIG. 7 is a diagram illustrating an exemplary embodiment of a video client.

Referring to FIG. 7, the video client 700 accesses the video server 600 across a network (e.g., Internet 550) to receive and process a real-time video stream. The video client 700 includes communications circuitry 702, a display 704, processor 706 and a memory 708. As illustrated, video client 700 includes one or more processors 706 that perform data processing and/or other software execution operations for the video client 700. The processor 706 may include logic devices, microcontrollers, processors, application specific integrated circuits (ASICs), field programmable gate arrays (FPGAs) or other devices that may be used by video client 700 to execute appropriate instructions, such as software instructions stored in memory 708 such as application module 710 and a web client module 712.

Video client 700 may receive a video stream from video server 600 and communicate with the video server 600 and other networked devices through communications circuitry 702. In an exemplary operation, a user of the video client 700 may access one or more video streams generated in real-time by the image capture devices 510, allowing the user to monitor a premises in real-time. The received video stream is processed in accordance with the embodiments described herein and output to display 704.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for streaming encoded video comprising:
obtaining, by a server, a fragmented video stream using a file-based video compression format; and
transmitting, by the server, the fragmented video stream to one or more client devices for real-time playback, each transmitted video fragment having timing information identifying a duration of the transmitted video fragment within the fragmented video stream;
wherein transmitting the fragmented video stream comprises, for at least one client device, dropping at least one video fragment from transmission to the client device to reduce the size of video fragment data transmitted to the client device, and updating the timing information in at least one preceding video fragment transmitted to the client device to increase the duration of the preceding video fragment to account for the dropped video fragment.

2. The method of claim 1 wherein the video stream is encoded using H.264 video compression.

3. The method of claim 1 wherein the file-based video compression format is MP4 compression.

4. The method of claim 1 wherein the generated fragmented video stream is packaged in a fragmented MP4 container for playback through a HTML5 video element on the client device.

5. The method of claim 1 further comprising:
generating the fragmented video stream;
wherein the generating comprises:
determining whether the client device requires MP4 fragment to start with an intra- coded frame; and
if the client device requires MP4 fragments to start with an intra-coded frame, generating an intra-coded frame at the beginning of each video fragment.

6. The method of claim 1 wherein said dropping at least one video fragment is performed if the client device is unable to process the full fragmented video stream.

7. The method of claim 1, wherein said dropping at least one video fragment is performed if the client device, and/or a network connection between the server and the client device, have a low bandwidth available for processing the fragmented video stream.

8. The method of claim 1, wherein the fragmented video stream is generated in real time from a video stream received from a camera for real-time playback.

9. The method of claim 1, wherein the fragmented video stream is transmitted to the one or more client devices for real-time playback as the one or more client devices join the in-process transmission of the fragmented video stream.

10. The method of claim 9 wherein when a client device joins the in-process transmission of the fragmented video stream, the server initially buffers a segment of the fragmented video stream before transmitting the segment to the client device, but does not buffer subsequent video fragments before transmitting them to the client device, to allow the client device to skip displaying the segment and start displaying the subsequent video fragments with a low delay.

11. A system for processing a real-time video stream comprising:
a video server comprising:
a streaming service configured to transmit a fragmented video stream to one or more video clients for real-time playback, each transmitted video fragment having timing information identifying a duration of the transmitted video fragment within the fragmented video stream;

wherein the streaming service is configured to determine, for at least one video client, that at least one segment is to be dropped from transmission to the video client to reduce the size of video fragment data transmitted to the video client, and configured to drop at least one video fragment from transmission to the video client, and to correspondingly update the timing information in at least one preceding video fragment transmitted to the video client to increase the duration of the preceding video fragment to account for the dropped video fragment.

12. The system of claim 11 wherein the video stream is encoded using a video compression format.

13. The system of claim 12 wherein the video compression format is MP4 compression.

14. The system of claim 11 wherein the fragmented video file is packaged in a fragmented MP4 container for playback through a HTML5 video element on the client device.

15. The system of claim 11 further comprising a fragmented video generator configured to generate the fragmented video stream, wherein the system is further configured to determine whether the client device requires an MP4 fragment to start with an intra-coded frame; and if the client device requires an MP4 fragment to start with an inter-coded frame, the fragmented video generator is configured to generate an intra-coded frame at the beginning of each video fragment.

16. The system of claim 11 wherein said dropping at least one video fragment is performed if the video client is unable to process the full fragmented video stream.

17. The system of claim 11, wherein said dropping at least one video fragment is performed if the video client, and/or a network connection between the streaming service and the video client, have a low bandwidth available for processing the fragmented video stream.

18. The system of claim 11, wherein the system is configured to generate the fragmented video stream in real time from a video stream received from a camera for real-time playback.

19. The system of claim 11, wherein the streaming service is configured to transmit the fragmented video stream to the one or more video clients for real-time playback as the one or more video clients join the in-process transmission of the fragmented video stream.

20. The system of claim 19 wherein when a video client joins the in-process transmission of the fragmented video stream, the system is configured to initially buffer a segment of the fragmented video stream before transmitting the segment to the video client, to allow the video client to skip displaying the segment and start displaying the subsequent video fragments with a low delay.

* * * * *

UNITED STATES PATENT AND TRADEMARK OFFICE
CERTIFICATE OF CORRECTION

PATENT NO. : 10,972,519 B2  
APPLICATION NO. : 15/275282  
DATED : April 6, 2021  
INVENTOR(S) : Gal Bar-Mashiah, Lior Ohana and Daniel Ben-Hoda Page 1 of 1

It is certified that error appears in the above-identified patent and that said Letters Patent is hereby corrected as shown below:

In the Specification

In the Cross Reference to Related Applications:
In Column 1, Lines 7-8, change "U.S. patent application Ser. No." to --U.S. Patent Application No.--.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*